Feb. 9, 1971     F. W. ROHNERT ET AL     3,561,187
METHOD AND APPARATUS FOR MAKING SEED TAPE
Filed March 20, 1968     2 Sheets-Sheet 1
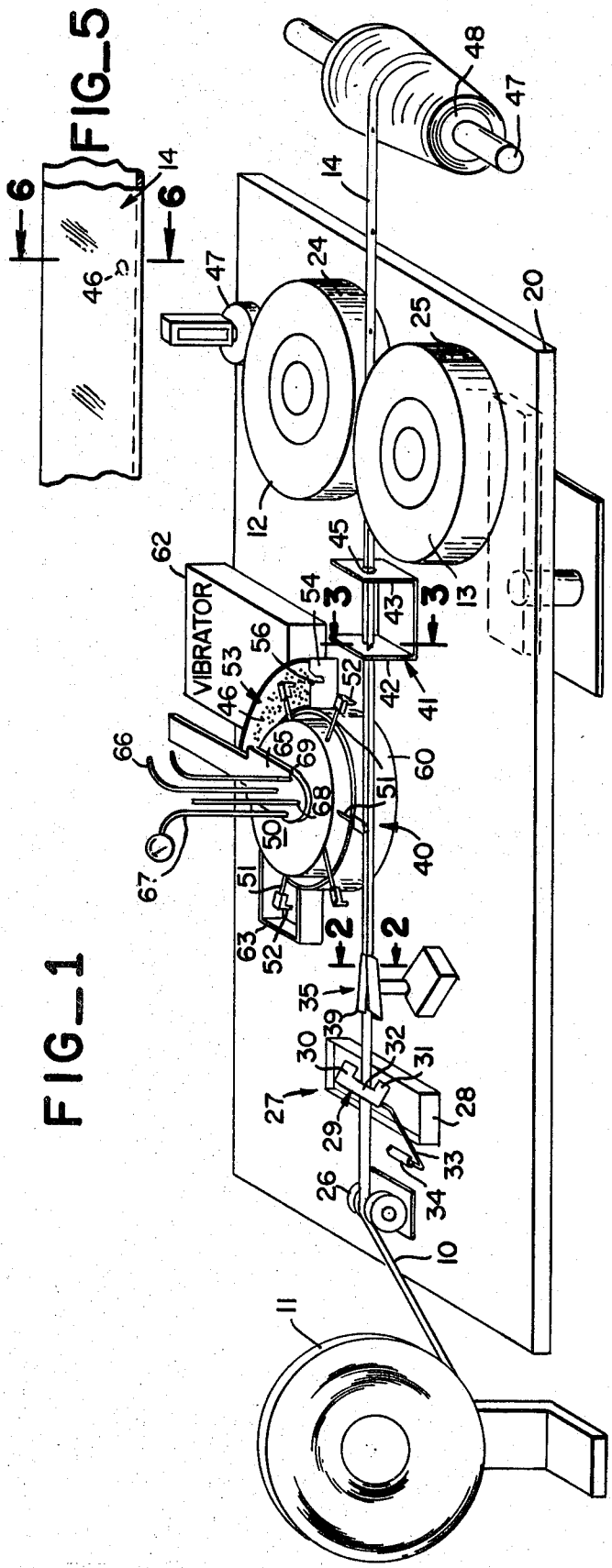
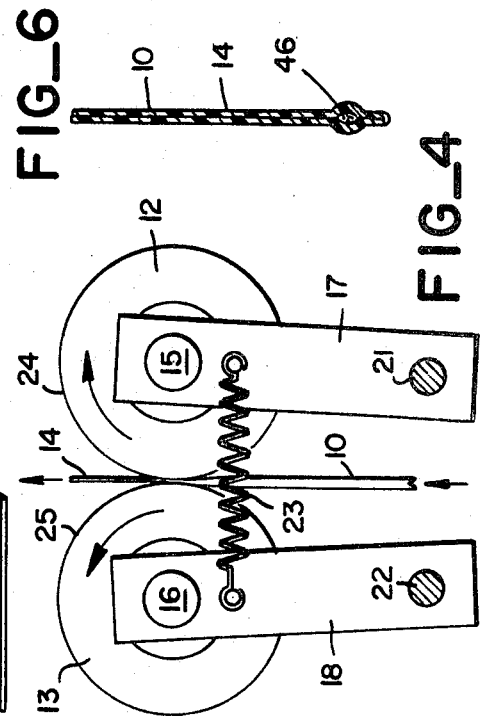
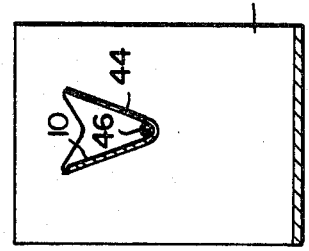
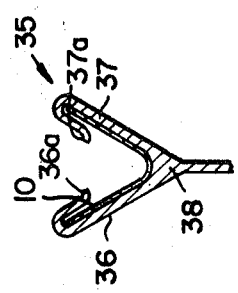
INVENTORS
FREDERICK W. ROHNERT
JAMES W. CHANEY
BY    HARUTO OKITA
BURNIE M. CRAIG
Owen, Wickersham & Erickson
ATTORNEYS

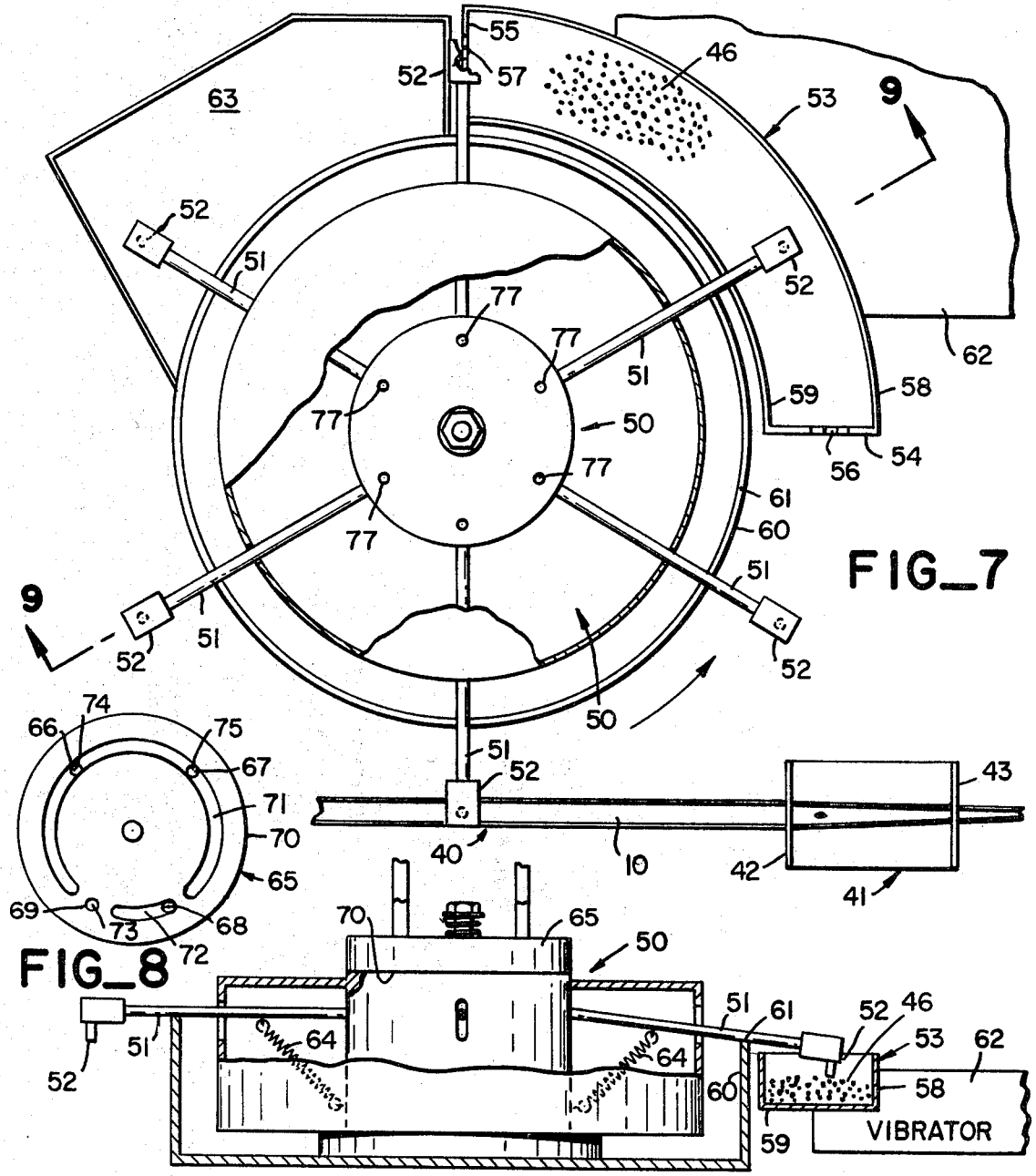

United States Patent Office 3,561,187
Patented Feb. 9, 1971

3,561,187
METHOD AND APPARATUS FOR MAKING SEED TAPE
Frederick W. Rohnert, Hollister, James William Chaney, Gilroy, Haruto Okita, Hollister, and Burnie M. Craig, Pasadena, Calif., assignors to Waldo Rohnert Co., Hollister, Calif., a corporation of California
Continuation-in-part of application Ser. No. 605,251, Dec. 28, 1966. This application Mar. 20, 1968, Ser. No. 721,542
Int. Cl. B65b 9/06
U.S. Cl. 53—28                                    14 Claims

ABSTRACT OF THE DISCLOSURE

Water-soluble tape is moistened to make it tacky, is troughed, and is moved past a seed-dispensing station where at spaced intervals one seed at a time (or one group of seeds at a time) is deposited in the tape. The tape is then closed to encapsulate the seed and wound around a core. The seeds are dispensed by a rotary device with nozzles that pass over a seed tray, pick up one seed at each nozzle by vacuum, and drop the seed upon release of the vacuum.

---

This application is a continuation-in-part of application Ser. No. 605,251, filed Dec. 28, 1966.

This invention relates to method and apparatus for making seed tape.

At various times it has been proposed to plant seeds by depositing in or on the ground a tape in which the seeds are imbedded or to which they are attached at spaced intervals. Most attempts to do so have been failures because of deficiencies in the seed tapes, but a practical seed tape has been described in patent application Ser. No. 519,674, filed Jan. 10, 1966, now U.S. Pat. No. 3,328,916. That patent tells how to use a special tape material, namely a water-soluble polyethylene oxide made by the Union Carbide Company under the trademark Radel, which has important characteristics that have at last made seed tape practical. Although the polyethylene oxide is water soluble, water can be applied in limited quantities to merely make the tape somewhat tacky without significantly decreasing its tensile strength, and this quality is used in the present invention. After the seed tape of that patent has been put into the ground, soil moisture readily dissolves the tape, leaving only the seed.

The present invention provides for economically making seed tape containing accurately placed seed. While the method of this invention can be practiced to some extent by hand, it then tends to be unduly slow and tedious and somewhat inaccurate; so use of the apparatus of the invention is practically essential.

To get the desired accurate lengthwise spacing between the seeds is one problem that is solved by the invention, and to achieve accurate spacing at considerable speed, so that miles of seed tape can be made in a single day, is another. The idea is to deposit one seed, or one group of seeds, in the tape at each of a series of uniformly spaced apart locations and to do so very quickly during rapid movement of the tape past the seed dispenser. It is also important to provide rapid and sure means for closing the tape on itself and to retain the initial position in which the seed is placed into the tape.

These things are accomplished by the present invention, by the steps of initially moistening the tape so that it will be slightly tacky, cupping or troughing it, dropping one seed (or one group of seeds) at a time into the tape, continuing the cupping or troughing action, closing the seed tape on itself, adhering it to itself and thereby encapsulating the seed therein, and then winding up the seed tape on a suitable core or reel.

The important problem of accurately depositing each seed and accurately spacing the successive seeds is done by picking up one seed at a time by vacuum and dropping it at the point where the dispenser passes over the troughed seed tape. The slight tackiness of the tape at this time may be used to adhere the seed to the tape in its proper position instead of letting it roll; or the center of the tape may be kept dry, especially for certain seeds, to let them orient themselves better and to prevent unwanted premature germination.

All these features and other objects and advantages and features of the invention will become clearer from the following description of a preferred embodiment.

In the drawings:

FIG. 1 is an isometric drawing of a seed tape manufacturing machine embodying the principles of the invention and performing the steps of the method of the invention.

FIG. 2 is an enlarged view taken along the line 2—2 in FIG. 1.

FIG. 3 is an enlarged view taken along the line 3—3 in FIG. 1.

FIG. 4 is a fragmentary bottom plan view showing the pressure connection between the drive and sealing rollers.

FIG. 5 is a view in elevation of a portion of the seed tape.

FIG. 6 is a view in section taken along the line 6—6 in FIG. 5.

FIG. 7 is a top plan view with the cover removed and with some other parts broken away, of the rotary seed dispensing device.

FIG. 8 is a bottom plan view of the stationary cover member removed from the rotary member in FIG. 7.

FIG. 9 is a view in elevation and partly in section taken along the line 9—9 in FIG. 7.

FIG. 10 is an enlarged fragmentary view in elevation and in section of the central portion of FIG. 7, taken along the line 10—10 in FIGS. 7 and 8.

As shown in the drawings, a polyethylene oxide tape 10 may initially come from a reel 11. Some other suitable source of tape 10 may replace the reel 11 if desired—for example, the tape 10 may come directly from a machine which produces the tape. The reel 11, if used, is mounted for generally free rotation, provided there is a sufficient friction to avoid runaway.

The tape 10 may be clear and transparent, or it may be colored and either clear or opaque. A color coding system may be used to denote different types of seeds or different grades of the same seed. Fertilizer, fungicide, and other types of material may be put into the tape during its manufacture or subsequent thereto.

The pulling of the tape 10 from the reel 11 is accomplished by a pair of drive discs 12 and 13, which also seal the finished seed tape 14 together. The discs 12 and 13 are driven by a suitable motor drive (not shown) and, as shown in FIG. 4, are each supported by a stub shaft 15, 16 on a swinging arm 17, 18 which is pivoted to a frame 20 by a pin 21, 22, and a spring 23 urges the two arms 17 and 18 toward each other so as to bring the peripheries 24, 25 of the discs 12 and 13 into a pressing and engaging contact with the tape 10. Thus the discs 12 and 13 also pull the tape 10 from the reel 11 and along the process line.

As the tape 10 leaves the reel 11 it passes over a roller 26 which helps to keep it taut, and from there goes to a moistening device 27. The moistener 27 may comprise a receptacle 28 containing water and a felt or other capillary member 29 shaped like an inverted U with two legs 30 and 31 extending down into the water and a central portion 32 above it and in engagement with the upper surface of the tape 10. The felt member 29 may be carried by a stiff wire member 33 which is supported on the frame 20 by a bracket 34. Thus, the tape 10 is held in contact with the felt member 29. The central portion 32 of the felt rests on the tape 10 to give the desired contact and tautness. The felt takes up a very small amount of moisture by capillary action from the receptacle 28 and applies it very gently to the tape 10. It is estimated that approximately a thimblefull of water may be applied in 5,000 feet of tape. The result is to make the tape 10 tacky without reducing its tensile strength. A dye may be used in the water to detect excess moisture in the tape. The adherence of the seed to the tape is optional. It may be desirable to so shape the felt that the center portion of the tape is kept dry, thereby enabling seed that is not round to arrange itself with its long axis parallel with the tape. Seeds that tend to roll may be kept in place by faling on an adhesive area of the tape.

After being moistened, the tape goes through a shaped cupping or troughing member 35 where it is shaped into the general V-shape or trough shape shown in FIG. 2. The trougher 35 may be two inclined walls 36 and 37 which merge toward a vertex 38. The walls 36 and 37 may be provided with folded-back portions 36a and 37a, which prevent the tape from climbing to the right or left and from becoming uncentered. They are quite important, and are so made that there is only a small permissible tolerance of movement by the tape up or down on either side. The trougher 35 may be shaped so that at its input end 39 it is substantially flat, and so that as the tape 10 moves through, the troughing is made sharper and sharper. From the trougher 35, the tape 10 passes by a dispensing station 40, beyond which is another tape-shaping member 41 which may have a pair of upstanding plates 42 and 43. There may also be other tape-supporting members in between the trougher 35 and the plate 42; for example, there may be a tape support at the dispensing station 40. The plate 42 has an opening 44 therethrough of approximately the same dimensions as that in FIG. 2, whereas the plate 43 has an opening 45 which is preferably more U-shaped than V-shaped, as a preparation for sealing the two halves of the tape 10 together when they pass between the discs 12 and 13. The seed is thus encapsulated in the tape, though there need not be close contact with all the seed surface, and the seed may be loose in the tape. A counter 47 may be attached to engage either disc 12 or 13 for accurate measurement of the length of the completed tape.

From the discs 12 and 13 the finished tape 14 with the seed 46 encapsulated goes to a take-up core 47a where the seed tape is collected. A frustoconical core 48 is preferable to a reel, although a reel may be used if desired. The core 48 enables many more feet of tape 10 to be placed within a smaller overall diameter.

The dispensing station 40 is one of the key features of the invention and requires more description. The tape 10 is moving quite rapidly, and it is desired to space the seeds very regularly but to have only one seed (or one group of seeds) in each location. The seed dispenser station 40 includes a rotating disc 50 from which projects a series of generally radial tubes 51 having nozzles 52 on their outer ends. The nozzles 52 are preferably removable, so that different sizes of nozzles may be applied, it usually being desirable to have a nozzle aperture slightly smaller than the size of seed being used, so that one and only one seed can be picked up by vacuum exerted through each aperture of the nozzle 52. The orifice or aperture of the nozzle 52 may be placed on the lower end of the nozzle or on the sidewall thereof, at the front or at varying angles to the travel arc of the arm 51, whichever is most advantageous for the size, weight, and type of seed to be taped.

In FIGS. 1 and 7, the disc 50 and tubes 51 are shown rotating counter-clockwise, and from about 270° to about 180° before they reach the dispensing station 40, is a seed hopper 53. The hopper 53 contains the seeds 46 to be picked up by the nozzles 52, and it may be kept supplied by an auxiliary hopper (not shown) or by simply adding seeds from time to time or by a belt feed or any other conventional device, all of which are omitted here for the sake of simplicity in the showing. The seeds are picked up by intruding the nozzles 52 into the hopper, and one means for accomplishing this is shown. Here, the seed hopper 53 has end walls 54 and 55 which are provided with notches 56 and 57 for enabling the entry and departure of the nozzles 52. The hopper 53 shown here is generally arcuate in shape and has a radially outer arcuate wall 58 and a radially inner wall 59. Close to the wall 59 may be a circular wall 60, the upper edge 61 of which here serves as a cam and continues 360° around the disc 50. The tubes 51 ride on the cam 61 and are attached flexibility to the disc 50 so that they can move up and down, urged down by small springs 64 and by the weight of the nozzles 52 to ride on the cam 61. Except at the seed hopper 53, the cam 61 holds the arms 51 generally horizontally, above the walls of the seed hopper 53, but when the nozzles approach the hopper 53, the cam 61 is depressed, and the arms 51 and nozzles 52 dip down into the hopper 53 to pick up the seeds 46.

Adjacent the seed hopper 53 and connected to it may be a vibrating mechanism 62 which may be of any conventional type. The vibrator 62 prevents the seed nozzles 52 from simply making a furrow on their first few passes through the hopper 53, leaving no more seeds to be picked up. The vibrator 62 keeps the seeds 46 moving so that no furrow is made, or at least any furrow is instantly filled in to give a generally level group of seeds. In the 180° between the end wall 55 of the seed hopper 53 and the dispensing station 40, there may be disposed a collector 63 in which seeds that are not firmly held may drop off. Thus, if any orifice of a nozzle 52 should pick up two seeds, one will drop off here. It has been found in practice that this is generally unnecessary, so it is only an optional attachment.

As shown in FIGS. 7 and 8, and also in connection with FIG. 1, four conduits lead into a stationary member 65 that overlies the rotary disc 50. A thin coating of heavy grease may be used between the discs 50 and 65 both as a lubricant and as a gas seal. A conduit 66 is used to communicate with a source of vacuum. A conduit 67 is used to communicate with a vacuum gauge. A conduit 68 may be used simply as an atmospheric bleed going to the atmosphere or to some other source of pressure approximately atmospheric or slightly higher, and a conduit 69 is connected to a source of above-atmospheric pressure, say about two atmopsheres. The member 65 has a lower surface 70 provided with an arcuate groove 71 into which open the two conduits 66 and 67. The conduit 68 is provided with a shorter arcuate groove 72. The outlets 74 and 75 from the conduits 66 and 67 enter into the groove 71. As a result, there is somewhat less than 270°, during which the groove 71 is connected to the source of vacuum and to the gauge. The atmospheric bleed 68 is connected to the short arcuate groove 72, and the source of pressure 69 is connected to the outlet 73 thereof disposed in the surface 70.

The rotating disc 50 has a series of openings 77 leading thereto, to each of which is attached a flexible connection 78 (see FIG. 10) for an arm 51. Each one of the six openings 77 is connected to vacuum for about 270°. The effect is that shortly before reaching the first end wall 54 of the hopper 53, each nozzle 52 becomes connected to the source of vacuum, so that it enters the hopper 53 under vaccum conditions and thereby is able to suck up its seed 46 and to carry it around to the dispensing station 40.

At this point or very slightly before, the vacuum is bled off to approximately atmospheric pressure by the atmospheric bleed 68, so that the seed 46 simply drops off the nozzle 52 into the cupped tape 10. After the nozzle 52 has passed beyond the tape 10, it is forcibly blown out by the above-atmospheric pressure conduit 69, to assure that it will not be plugged. For example, if a seed or some foreign matter should have gotten stuck in the nozzle, it might render the device inoperative and might prevent picking up seed again; blowing out assures that that will not happen.

The power device which drives the rotating disc 50 is synchronized with that which drives the discs 12 and 13; therefore, the relative movement is kept to any appropriate ratio. They may go at the same speed or different speeds, but they are synchronized for movement together.

In operation, the tape 10 is pulled from the reel 11, moistened by the device 27 enough to make it tacky without detracting from its tensile strength, troughed by the members 35 and 41, and then seeds are dropped at spaced intervals into the cupped tape. The cupped tape 10 is closed together and sealed by the discs 12 and 13 and is wound up on the take-up reel 48. The seed dispenser typically picks up one seed at a time by vacuum from the hopper 53, and, by approximately atmospheric bleed, the vacuum is released and the seed is dropped into the cupped tape.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A method of manufacturing seed tape from a water-soluble plastic tape, comprising the steps of
   initially barely moistening at least one continuous edge margin on one side of said tape just enough to make it slightly tacky, without substantially reducing its tensile strength,
   then moving the seed tape past a seed-dispensing station at a constant speed,
   picking seeds up from a store of seeds by vacuum at a constant rate by a rotary pick-up device,
   rotating said seeds generally horizontally at a constant speed,
   relasing the vacuum to atmospheric pressure at said seed-dispensing station, thereby depositing seeds on the tape at spaced intervals,
   closing the tape on itself and adhering it to itself without added adhesive by its own tackiness to encapsulate the seeds therein, and
   winding the tape on a suitable core.

2. A method of manufacturing seed tape from a water-soluble plastic tape, comprising the steps of
   initially barely moistening at least one continuous edge margin on one side of said tape just enough to make it slightly tacky, without substantially reducing its tensile strength,
   troughing the moistened tape without touching the moistened side,
   moving the troughed seed tape past a seed-dispensing station at a constant speed,
   picking up seeds individually from a store of seeds, by vacuum with a rotating pick-up device,
   rotating the seeds generally horizontally at constant speed,
   releasing the vacuum to atmospheric pressure at said seed-dispensing station, thereby depositing one seed at a time into the troughed tape at spaced intervals,
   closing the tape on itself and adhering it to itself by its own tackiness to encapsulate the seeds therein, and
   winding the tape on a suitable core.

3. A device for manufacturing seed tape from a water-soluble plastic tape, comprising
   means for initially barely moistening at least one continuous edge margin on one side of said tape just enough to make it slightly tacky, without substantially reducing its tensile strength,
   a seed-depositing station beyond said means for moistening,
   means for moving the moistened seed tape past said seed-depositing station at a constant speed,
   a store of seeds spaced from said seed-depositing station,
   rotary pick-up means rotating generally horizontally about a vertical axis to one side of the path of said moistened seed tape and passing said seed depositing station and said store of seeds, said rotary pick-up means having means for picking up seeds by vacuum from said store of seeds and for releasing the vacuum to atmospheric pressure at said seed-depositing station,
   means for rotating said rotary pick-up means at a constant rate, thereby depositing seeds on the tape at spaced intervals,
   pressure means for closing the tape on itself and adhering it to itself by its own tackiness to encapsulate the seeds therein, and
   means for winding the tape on a suitable core.

4. A device for manufacturing seed tape from a water-soluble plastic tape, comprising
   means for initially barely moistening at least one continuous marginal edge of one side of said tape just enough to make it slightly tacky, without substantially reducing its tensile strength,
   means for troughing the moistened tape without touching the moistened side,
   means for moving the troughed seed tape at a constant speed,
   a store of seeds spaced horizontally from the moving tape,
   rotary pick-up means rotating generally horizontally about a vertical axis located in between said store of seeds and the moving tape and having means for picking up seeds individually from said store by vacuum and for releasing them individually over the moving tape by release of the vacuum to atmospheric pressure,
   means for rotating said rotary pick-up means at a constant speed thereby depositing one seed at a time into the troughed tape at spaced intervals,
   pressure means for closing the tape on itself and adhering it to itself by its own tackiness to encapsulate the seeds therein, and
   means for winding the tape on a suitable core.

5. A machine for manufacturing seed tape from a water-soluble tape material, including in combination
   feed means for supporting a roll of said water-soluble tape,
   take-up means for the completed seed tape,
   drive means for engaging the seed tape and pulling it tautly from said feed means and relaying it to said take-up means,
   moistening means between said feed means and said drive means for slightly moistening said tape without substantially reducing its tensile strength,
   troughing means between said moistening means and said drive means for shaping said tape into a troughed shape, without touching the moistened side,
   seed dispensing means for feeding seeds into the troughed tape at spaced intervals, and
   means for closing the troughed tape around its included seed and pressing it together so that the pressure and moisture seal it,
   said seed dispensing means comprising
   a stationary horizontal support having a first arcuate groove extending about 270° and having a first opening thereinto, a second shorter arcuate groove extending at the same radius as the first groove and succeeding it and having a second opening thereinto, vacuum producing means connected to said extended arcuate portion by said first opening, approximately atmospheric bleed means connected to said second opening, a third opening leading into said support between said grooves, above-atmospheric pressure means connected to said third opening, a horizontal rotary device having a series of generally radially extending conduit means each having pick-up nozzle means with at least one aperture at their outer ends and having at their inner ends inlets horizontally overlying said arcuate grooves and openings during rotation about a vertical axis with means sealing said grooves against substantial leakage, a seed-containing hopper below said nozzle means, means for intruding said nozzles down into and leading them up from said seed hopper along a generally horizontal path as said rotary device rotates, and a dispensing locus to one side of said hopper at about the same line, said grooves and rotary device being disposed so that said nozzle means are connected to said vacuum source when introduced into said hopper and pick up one seed at each said nozzle aperture and carry it from said hopper to said dispensing locus, at which point said nozzle means communicates with said bleed means and drops its seed, and then before re-entering said hopper is blown out by said above-atmospheric pressure means.

6. The machine of claim 5 having, associated with said hopper, means for preventing the formation of a permanent furrow through the seeds in said hopper.

7. A machine for manufacturing seed tape from a water-soluble tape material, including in combination feed means for supporting a roll of said water-soluble tape, take-up means for the completed seed tape, drive means for engaging the seed tape and pulling it tautly from said feed means and relaying it to said take-up means, moistening means between said feed means and said drive means for slightly moistening said tape without substantially reducing its tensile strength, troughing means between said moistening means and said drive means for shaping said tape into a troughed shape, seed dispensing means for feeding seeds into the troughed tape at spaced intervals, and means for closing the troughed tape around its included seed and pressing it together so that the pressure and moisture seal it, said seed dispensing means comprising a stationary support having a first arcuate groove extending about 270° and having a first opening thereinto, a second shorter arcuate groove extending at the same radius as the first groove and succeeding it and having a second opening thereinto, vacuum producing means connected to said extended arcuate portion by said first opening, approximately atmospheric bleed means connected to said second opening, a third opening leading into said support between said grooves, above-atmospheric pressure means connected to said third opening, a rotary device having a series of generally radially extending conduit means each having a pick-up nozzle means with at least one aperture at their outer ends and having at their inner ends inlets overlying said arcuate grooves and openings during rotation with means sealing said grooves against substantial leakage, a seed-containing hopper, means for preventing the formation of a permanent furrow through the seeds in said hopper, comprising a vibrator, means for intruding said nozzles into and leading them from said seed hopper as said rotary device rotates, and a dispensing locus, said grooves and rotary device being disposed so that said nozzle means are connected to said vacuum source when introduced into said hopper and pick up one seed at each said nozzle aperture and carry it from said hopper to said dispensing locus, at which point said nozzle means communicates with said bleed means and drops its seed, and then before re-entering said hopper is blown out by said above-atmospheric pressure means.

8. A machine for manufacturing seed tape from a water-soluble tape material, including in combination feed means for supporting a roll of said water-soluble tape, take-up means for the completed seed tape, drive means for engaging the seed tape and pulling it tautly from said feed means and relaying it to said take-up means, moistening means between said feed means and said drive means for slightly moistening said tape without substantially reducing its tensile strength, troughing means between said moistening means and said drive means for shaping said tape into a troughed shape, seed dispensing means for feeding seeds into the troughed tape at spaced intervals, and means for closing the troughed tape around its included seed and pressing it together so that the pressure and moisture seal it, said seed dispensing means comprising a stationary support having a first arcuate groove extending about 270° and having a first opening thereinto, a second shorter arcuate groove extending at the same radius as the first groove and succeeding it and having a second opening thereinto, vacuum producing means connected to said extended arcuate portion by said first opening, approximately atmospheric bleed means connected to said second opening, a third opening leading into said support between said grooves, above-atmospheric pressure means connected to said third opening, a rotary device having a series of generally radially extending conduit means each having pick-up nozzle means with at least one aperture at their outer ends and having at their inner ends inlets overlying said arcuate grooves and openings during rotation with means sealing said grooves against substantial leakage, a seed-containing hopper, means for intruding said nozzles into and leading them from said seed hopper as said rotary device rotates, said means for intruding comprising a cam arrangement, and a dispensing locus, said grooves and rotary device being disposed so that said nozzle means are connected to said vacuum source when introduced into said hopper and pick up one seed at each said nozzle aperture and carry it from said hopper to said dispensing locus, at which point said nozzle means communicates with said bleed means and drops its seed, and then before re-entering said hopper is blown out by said above-atmospheric pressure means.

9. A seed dispensing device for a seedtape making machine, including in combination
a stationary horizontal support having first and second arcuate grooves lying along an annular path and having first, second and third openings thereinto along said path, said first opening leading into said first groove and said second opening leading into said second groove and said third opening lying between the end of said second groove and the beginning of said first groove,
vaccum producing means connected to said first arcuate portion by said first opening,
approximately atmospheric bleed means connected to said second opening,
above-atmospheric pressure means connected to said third opening,
a horizontal rotary device for rotation about a vertical axis having a series of generally radially extending conduit means each having pick-up nozzle means with at least one aperture at their outer ends and having at their inner ends inlets horizontally overlying said annular path, with means sealing said grooves against substatnial leakage,
a seed-containing hopper below said nozzle means,
means for intruding said nozzle down into and leading them up from said seed hopper along a generally horizontal path as said rotary device rotates, and
a dispensing locus to one side of said hopper at about the same level,
said grooves and rotary device being disposed so that said nozzle means are connected to said vacuum source when introduced into said hopper and pick up one seed at each said nozzle aperture and carry it from said hopper to said dispensing locus, at which point said nozzle means communicates with said bleed means and drops its seed, and then before re-entering said hopper is blown out by said above-atmospheric pressure means.

10. The device of claim 9 having, associated with said seed hopper, means for preventing the formation of a permanent furrow through the seeds in said hopper.

11. A seed dispensing device for a seed-tape making machine, including in combination
a stationary support having first and second arcuate grooves lying along an annular path and having first, second and third openings thereinto along said path, said first opening leading into said first groove and said second opening leading into said second groove and said third opening lying between the end of said second groove and the beginning of said first groove,
vacuum producing means connected to said first arcuate portion by said first opening,
approximately atmospheric bleed means connected to said second opening,
above-atmospheric pressure means connected to said third opening,
a rotary device having a series of generally radially extending conduit means each having pick-up nozzle means with at least one aperture at their outer ends and having at their inner ends inlets overlying said annular path, with means sealing said grooves against substantial leakage,
a seed-containing hopper,
means for intruding said nozzles into and leading them from said seed hopper as said rotary device rotates,
means associated with said seed hopper for preventing the formation of a permanent furrow through the seeds in said hopper, comprising a vibrator,
a dispensing locus,
said grooves and rotary device being disposed so that said nozzle means are connected to said vacuum source when introduced into said hopper and pick up one seed at each said nozzle aperture and carry it from said hopper to said dispensing locus, at which point said nozzle means communicates with said bleed means and drops its seed, and then before re-entering said hopper is blown out by said above-atmospheric pressure means.

12. A seed dispensing device for a seed-tape making machine, including in combination
a stationary support having first and second arcuate grooves lying along an annular path and having first, second and third openings thereinto along said path, said first opening leading into said first groove and said second opening leading into said second groove and said third opening lying between the end of said second groove and the beginning of said first groove,
vacuum producing means connected to said first arcuate portion by said first opening,
approximately atmospheric bleed means connected to said second opening,
above-atmospheric pressure means connected to said third opening,
a rotary device having a series of generally radially extending conduit means each having pick-up nozzle means with at least one aperture at their outer ends and having at their inner ends inlets overlying said annular path, with means sealing said grooves against substantial leakage,
a seed-containing hopper,
means for intruding said nozzles into and leading them from said seed hopper as said rotary device rotates, said means for intruding comprising a cam arrangement, and
a dispensing locus,
said grooves and rotary device being disposed so that said nozzle means are connected to said vacuum source when introduced into said hopper and pick up one seed at each said nozzle aperture and carry it from said hopper to said dispensing locus, at which point said nozzle means communicates with said bleed means and drops its seed, and then before re-entering said hopper is blown out by said above-atmospheric pressure means.

13. A method for manufacturing seed tape, from a water-soluble plastic tape of the type wherein at least part of the tape is initially moistened to make it tacky, then seeds are deposited on the tape at spaced intervals, and then the tape is closed on itself and adhered to itself, characterized by the stage of depositing the seeds on the tape comprising
moving the seed tape past a seed-dispensing station at a constant speed,
picking up seeds from a store of seeds by vacuum at a constant rate by a generally horizontal rotary pick-up device,
rotating said device generally horizontally at a constant speed,
releasing the vacuum to atmospheric pressure at said seed-dispensing station, and
thereby dropping the seeds on to the tape.

14. A device for manufacturing seed tape from a water-soluble plastic tape, wherein the tape is at least partially moistened, is then moved past a seed-dispensing station to receive seeds, and is then closed on itself by pressure, characterized by
means for moving the moistened tape past said seed-dispensing station at a constant speed,
a store of seeds spaced horizontally from said seed-dispensing station,
rotary pickup means mounted for generally horizontal rotation about a vertical axis in between said seed-dispensing station and said store of said seeds, said rotary pickup means having means for picking up seeds by vacuum from said store of seeds and for releasing the vacuum to atmospheric pressure at said seed-dispensing station, and means for rotating said rotary pickup means at a constant rate.

References Cited

UNITED STATES PATENTS

| | | | |
|---|---|---|---|
| 2,455,701 | 12/1948 | Putman et al. | |
| 1,160,278 | 11/1915 | Gray et al. | 53—180 |
| 3,046,714 | 7/1962 | Malicay | 53—180 |
| 3,240,175 | 3/1966 | Clow | 221—211 |

FOREIGN PATENTS 474,764  4/1929  Germany.

THERON E. CONDON, Primary Examiner

E. F. DESMOND, Assistant Examiner

U.S. Cl. X.R.

53—180